(No Model.)
T. H. LOGAN.
DEVICE FOR CONNECTING PICKING STRAPS TO THE PICKING STICKS OF LOOMS.
No. 290,899. Patented Dec. 25, 1883.
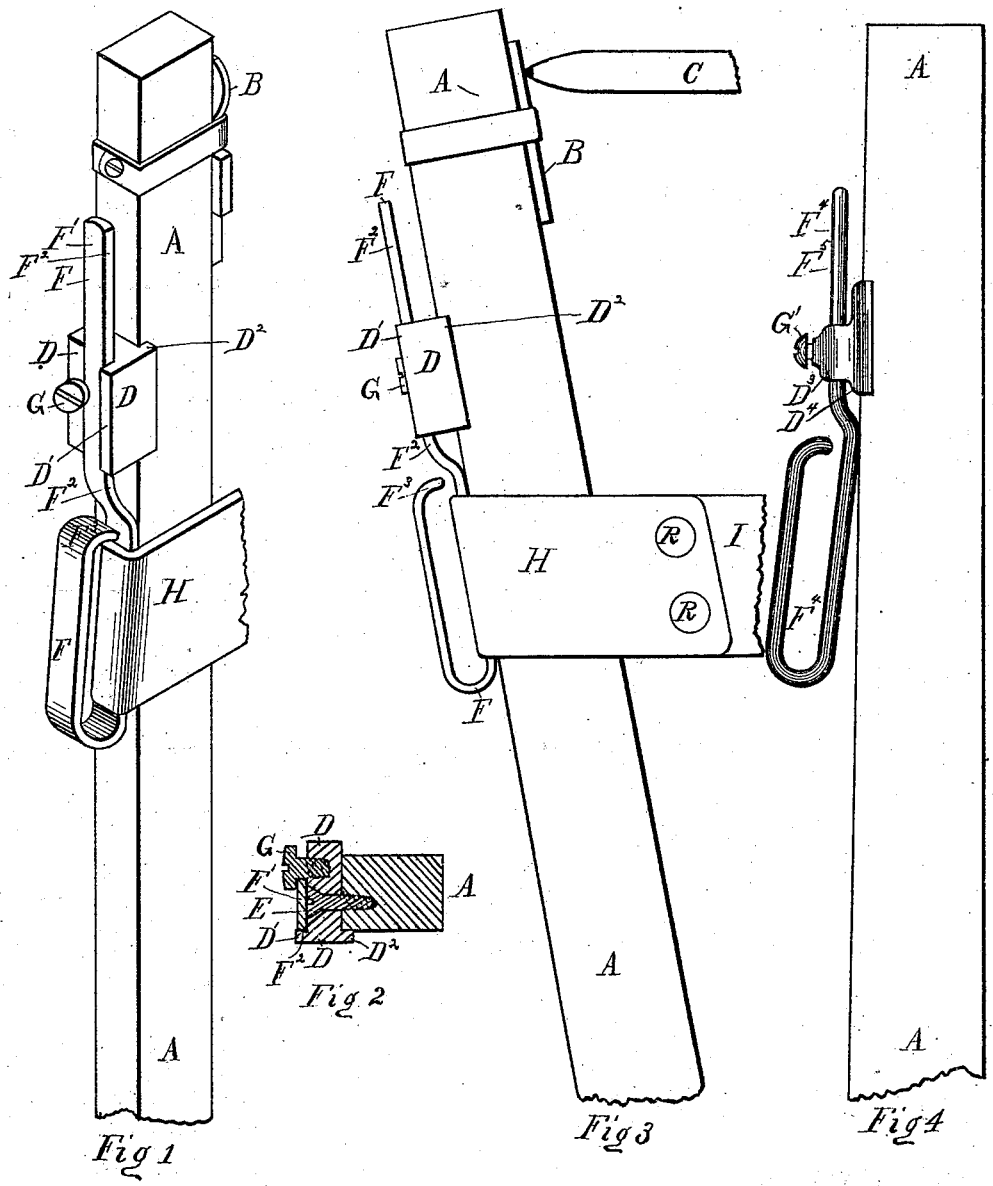
Witnesses
Simeon G. Lyford
Wilfred P. Taylor
Inventor
Thomas H. Logan,
By Albert M. Moore,
His Attorney.

UNITED STATES PATENT OFFICE.

THOMAS H. LOGAN, OF LOWELL, MASSACHUSETTS.

DEVICE FOR CONNECTING PICKING-STRAPS TO THE PICKING-STICKS OF LOOMS.

SPECIFICATION forming part of Letters Patent No. 290,899, dated December 25, 1883.

Application filed August 18, 1882. (No model.)

*To all whom it may concern:*

Be it known that I, THOMAS H. LOGAN, of Lowell, in the county of Middlesex and Commonwealth of Massachusetts, have invented certain new and useful Improvements in Devices for Connecting Picking-Straps to the Picking-Sticks of Looms, of which the following is a specification.

My invention consists in the combination of a block and a set-screw with a loop provided with a shank adapted to be grasped and held between said block and set-screw; also, in the combination of a block provided with a beveled rib with a loop formed of elastic material and provided with a beveled shank and a set-screw; also, in the combination of a loop formed of spring metal with means of attaching said loop to a picking-stick.

In the accompanying drawings, Figure 1 is a perspective view of the upper part of a picking-stick with a picker attached thereto, showing my invention applied thereto and part of a picking-strap. Fig. 2 is a cross-section of the picking-stick, block, and shank of the loop through the screws and at right angles to the axis of said stick. Fig. 3 is a side elevation of the stick, picker, loop, and part of the picking-strap, part of a shuttle, and my improvements. Fig. 4 is a side elevation of a picking-stick with a modification of my improvements attached thereto.

A is the picking-stick; B, the picker, attached in the usual manner to said stick; C, a shuttle in position to be thrown by said picker and stick; I, the picking-strap; and H is a loop formed in the picking-strap, all of the above being of the usual construction and operation.

It may be well to call to mind here the well-known fact that the ordinary loop for connecting the picking-strap to the picking-stick is a strap of leather, one end of which is passed up through the loop H of the picking-strap, and both ends of which are held by a single screw passing through said ends and into the picking-stick above said loop H. The picking-stick A turning upon a center at or near its lower end, and its upper end describing the arc of a circle, it is evident that the nearer the loop H is to the top of said stick the less forcible will be the blow of the picker B upon the shuttle; hence the stick, which is usually made of ash, is provided with some half a dozen holes placed about half an inch apart, and the screw last named is placed in one or another of these holes, according as it is desired to make a lighter or a heavier pick. Now, it is frequently desirable to adjust the force with which the picker strikes the shuttle much more nicely than could be done by the above-described means, even if the holes were bored as near together as possible. Further, it is very difficult to make the holes, and after removing the screw a few times the holes are worn larger and the screw becomes loose. Again, when the loop H becomes so worn as to be useless, it is necessary to remove the loop which connects the picking-strap to the picking-stick, in order to introduce into it a new picking-strap loop. My object is to remedy these defects, which I do by the means described below.

D is a block, preferably of metal, provided with a straight rib, $D^2$, and a beveled rib, D'. The straight rib $D^2$ lies against one side of the picker-stick A, to prevent the block D from turning on said stick. There may be another rib corresponding to the rib $D^2$ to lie against the other side of the stick. The back of the block rests against the outer edge of the picking-stick, and said block is secured to said stick by the screw E, which runs through the block and into the stick. The rib D' is beveled under to receive the beveled edge of the shank of the loop F. The loop F is made, preferably, of a narrow strip of sheet metal, narrower at least than the picker-stick, and is provided with a shank, F', which is beveled on one edge, (at $F^2$,) and this beveled edge fits under the bevel of the rib D'. (See Fig. 2.) The shank F' is held down against the block D by the set-screw G, which enters a threaded hole in said block. The set-screw G should be placed near enough to the rib D' to crowd the beveled side of the shank F' under the beveled side of the rib D'. The set-screw is a cap-screw—that is, it has a large head, flat on the under side, to draw the shank F' down close to the block D. It is evident that if the screw G be loosened the shank F' may be moved up or down endwise between the block D, rib D', and screw G to any extent less than the length of said shank, and then held in place by setting up said set-screw and pinching said shank. This admits of a very fine adjustment. The loop proper is of the form shown, and the free end thereof is bent over at F³, so as almost or quite to touch the other side of the loop. This bent end of the loop F prevents the picking-strap from rising out of said loop F by accident or by jarring of the stick A, but allows the strap to be placed in or removed from the loop F when the latter is opened. as it may be by drawing the free bent end F³ away from the shank F' by the thumb and finger. The strap may then be passed into or out of the top of the loop F.

In the modified form of my invention shown in Fig. 4 the loop F⁴ is made of round wire, (spring-wire,) and its shank F⁵ is passed through a hole in a projection, D³, cast on the block D⁴, and a set-screw, G', turning in the projecting part D³, thrusts with its point against the shank F⁵ and holds said shank in place. Except as above mentioned, the loop F⁴ and block D⁴ are like the loop F and block D, respectively.

I claim as my invention—

1. The combination of the block and the set-screw with the loop provided with a shank adapted to be grasped and held between said block and set-screw, as and for the purpose specified.

2. The combination of the block D, provided with a beveled rib, D', with the loop F, formed of elastic material, and provided with a beveled shank, F', and a set-screw, G, as and for the purpose specified.

3. The combination of the loop F, formed of spring metal, with means for attaching said picking-loop to a stick, as and for the purpose specified.

THOMAS H. LOGAN.

Witnesses:
ALBERT M. MOORE,
JOHN WESTWOOD.